March 6, 1962     A. M. BRENNEKE     3,024,029
PISTON RING
Filed April 2, 1959
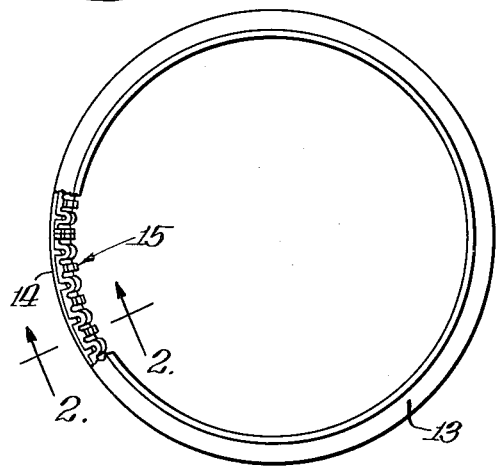
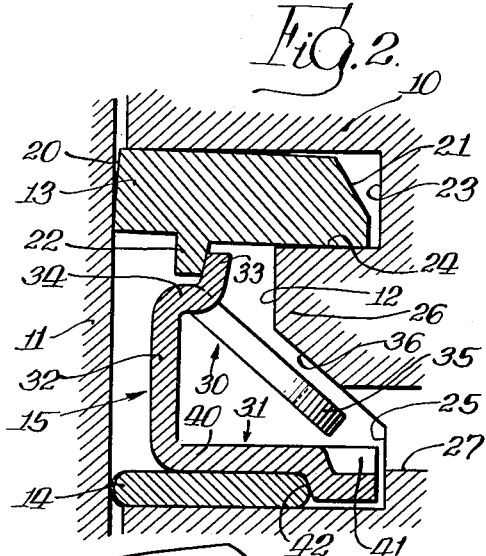
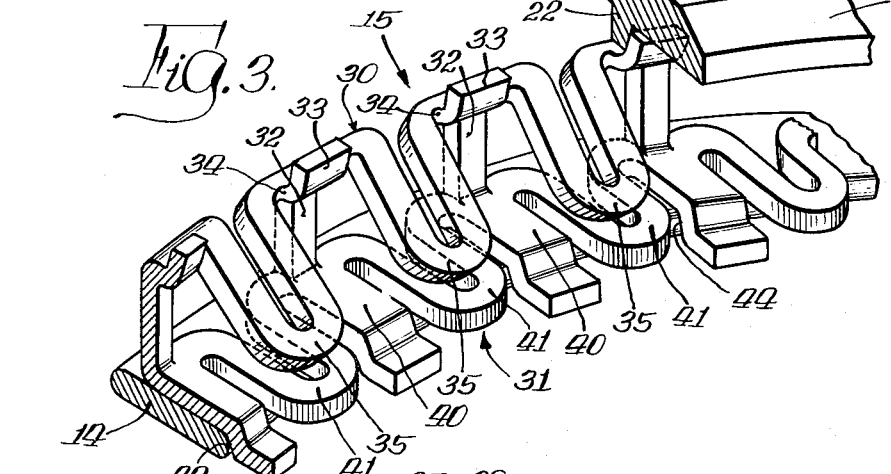
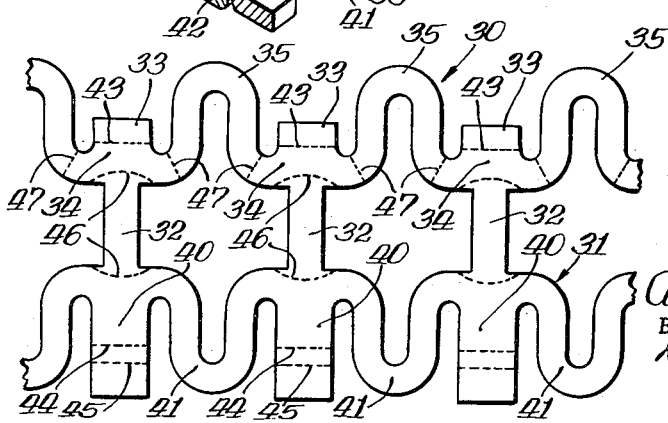
INVENTOR.
Arthur M. Brenneke,
BY Davis, Lindsey, Hibben & Noyes
Attys.

3,024,029
PISTON RING
Arthur M. Brenneke, Hagerstown, Ind., assignor to Perfect Circle Corporation, Hagerstown, Ind., a corporation of Indiana
Filed Apr. 2, 1959, Ser. No. 803,777
34 Claims. (Cl. 277—139)

The invention relates to a piston and piston ring construction for an internal combustion engine.

The general object of the invention is to provide a novel piston and piston ring construction, the latter comprising a combined compression and oil ring mounted in a single groove in the piston.

Another object is to provide a novel piston ring comprising a compression ring member, an oil ring member, and a spacer-expander for holding the members axially spaced and urging them outwardly against the cylinder wall, and also for urging the members into sealing engagement with surfaces of the groove.

A further object is to provide a novel piston ring comprising a compression ring member and an oil ring member, and means for independently urging the respective members outwardly.

Still another object is to provide a novel, spacer-expander for a piston ring comprising compression and oil ring members.

Other objects and advantages will become apparent from the following description taken in connection with the accompanying drawing, in which:

FIG. 1 is a plan view, partially broken away, of a combined compression and oil ring embodying features of the invention;

FIG. 2 is an enlarged radial sectional view of the ring shown in FIG. 1 and illustrating the ring when mounted in a piston located in a cylinder;

FIG. 3 is a fragmentary perspective view of the ring; and

FIG. 4 is a plan view of a blank from which a spacer-expander of the ring is formed.

In an automobile engine of the type ordinarily used at the present time, each piston is usually provided with two compression rings and an oil ring placed respectively in separate grooves. Such grooves determine to some extent the axial length of the piston and hence the overall height of the engine. In modern automobiles with the large amount of auxiliary equipment under the hood of the car and with the design of the car being as low as possible, decreasing the overall engine height would be advantageous.

The present invention permits use of shorter pistons and hence a decrease in the overall engine height by providing a piston construction having a groove in which a combined compression and oil ring is mounted. While the groove in which such combined ring is mounted may be somewhat wider than the groove used for an ordinary compression ring or oil ring, the necessity of providing a land between the oil ring and the lower compression ring is eliminated and the axial height of the piston may therefore be reduced. The reduction in height of the engine also results in a reduction in the weight thereof.

Thus, a ring embodying the features of the invention and adapted to be mounted in a single groove in the piston comprises a compression ring member, an oil ring member and a spacer-expander which functions to force both members outwardly against the cylinder wall and also to urge the members into sealing engagement with surfaces of the groove. The groove is shaped in a special manner to cooperate with the ring, and a spacer-expander of novel construction is utilized.

In the embodiment of the invention shown in the drawing, a piston is fragmentarily shown at 10 in FIG. 2, the piston being mounted in a cylinder, a portion of which is shown at 11. The piston 10 is provided with a groove indicated generally at 12 to receive the ring. The latter comprises a compression ring member 13, an oil ring member 14, and a spacer-expander, indicated generally at 15, for holding the two members axially spaced as well as for forcing them outwardly against the cylinder 11 and for urging them into sealing engagement with surfaces of the groove 12.

The compression ring member 13 is shown as being generally rectangular cross-section, similar to the usual compression ring, and may have either a straight face or a taper face. In the present instance, the compression ring member is shown as having a straight face 20 and the member is shaped so that it tends to twist upwardly at its outer periphery. The straight face thus meets the cylinder wall at a small angle and functions as a taper face. To give the member 13 a tendency to twist, it may be beveled at its inner upper corner as shown at 21. On its lower side, the member 13 is provided with means to cooperate with the spacer-expander 15, which means in the present embodiment comprises an annular downwardly projecting rib 22.

To receive the compression ring member 13, the groove 12 at its upper side is provided with an annular inwardly extending channel 23 providing an upwardly facing ledge 24. The ring member 13 extends into the channel 23 and overlies the ledge 24, the twist in the member 13 tending to cause the ring member to engage the upper side of the groove at the periphery of the piston and to engage the ledge 24 at the lower inner corner of the ring member, to provide sealing engagement with such surfaces. While it is desirable that the ring member 13 have sealing engagement with both the upper side of the groove and the ledge 24, it is of course possible that, during portions of the engine cycle, the ring member may be somewhat flattened and engage only one of the two groove surfaces.

The oil ring member 14 is shown as a rail of usual form and comprising a flat strip of metal bent edgewise and preferably having rounded inner and outer edges. To receive the inner portion of the member 14 and a cooperating portion of the spacer-expander 15, the groove 12 is also provided with an annular inwardly extending channel 25 at its lower side. The channels 23 and 25 thus form an annular rib 26 projecting radially outward from the bottom of the groove, the upper surface of the rib being the ledge 24. One or more drain holes 27 may be provided in the piston, extending inwardly from the channel 25 to drain any oil in the groove back to the crankcase of the engine.

The spacer-expander 15, as hereinbefore mentioned, holds the two members 13 and 14 axially spaced and also forces them outwardly against the cylinder wall and urges them into sealing engagement with surfaces of the groove. The spacer-expander is preferably of circumferentially expansible construction and comprises a pair of independently functioning spring structures, the upper spring structure being indicated generally at 30 and cooperating with the compression ring member 13, and the lower spring structure being indicated generally at 31 and cooperating with the oil ring member 14. The spring structures 30 and 31 are connected by a plurality of circumferentially spaced axially extending struts 32, the circumferential spacing providing for free flow of oil through the spacer-expander to the drain holes 27.

The compression ring member 13 and the space-expander 15 have interengaging means to force the member 13 outwardly and tending to force the ring member into sealing engagement with surfaces of the groove. The interengaging means, in the present instance, comprises the rib 22 on the compression ring member and a plurality of ears 33 forming part of the upper spring structure 30 and engaging the inner face of the rib 22. Thus, the pressure of the ears 33 outwardly on the rib 22 forces the compression ring member outwardly against the cylinder wall. The inner face of the rib 22 and the outer faces of the ears 33 are slanted downwardly and outwardly at a small angle to an axial line so that the pressure of the ears 33 against the rib 22 has a small component of force exerted axially on the compression ring member. The rib 22 is located outwardly of the ledge 24 and adjacent the outer periphery of the ring member. Such axial component of force thus tends to increase the tendency of the ring member to twist and effect sealing engagement with the upper side of the groove and with the ledge 24.

Each of the spring structures 30 and 31 comprises a plurality of connecting elements and a plurality of spring elements, the two alternating with each other circumferentially of the ring. Thus, the upper spring structure comprises a plurality of connecting elements 34 connected to the upper ends of the struts 32 and bent to extend inwardly therefrom. The inner end portions of the connecting elements 34 are bent upwardly to form the ears 33. The spring elements of the upper spring structure are U-shape as indicated at 35 and open outwardly of the ring with the free ends of the arms of each U turned circumferentially and connected to the adjacent connecting elements 34. The spring elements 35 are slanted downwardly and inwardly to avoid the rib 26 in the bottom of the groove and the lower outer corner of the rib 26 is beveled as at 36 to provide space for the spring elements.

The lower spring structure 31 is similar to the upper spring structure and comprises alternately arranged connecting elements 40 and U-shape spring elements 41. The connecting elements 40 are connected to the lower ends of the struts 32 and extend inwardly therefrom to overlie the rail 14. Adjacent its inner end, each connecting element 40 is bent to extend downwardly and then inwardly, to provide a shoulder 42 engaging the inner periphery of the rail 14. The shoulder 42 is at a slight angle to an axial line, so that it not only forces the rail outwardly but tends to urge the inner peripheral portion of the rail against the lower side of the groove and into sealing relation therewith. The U-shape spring elements 41 lie in the same plane with the outer portions of the connecting elements 20 and thus overlie the rail 14, the spring elements 41 and the connecting elements 40 thereby holding the rail at the lower side of the groove in axially spaced relation to the compression ring member 13. The lower channel 25 of the groove is of sufficient depth to receive the inner portion of the lower spring structure 31.

The spacer-expander 15 may be made of a strip of sheet metal which is punched as illustrated in FIG. 4 to provide the spring structures 30 and 31 and the connecting struts 32. The connecting elements 34 of the upper spring structure 30 are then bent along lines 43 to provide the ears 33 and the connecting elements 40 of the lower spring structure 31 are bent along lines 44 and 45 to provide the shoulders 42. The spring structures 30 and 31 are also bent along lines 46 to position them at right angles to the struts 32, and the U-shape spring elements 35 of the upper spring structure 30 are then bent on lines 47 to slant downwardly and inwardly.

The spacer-expander 15 thus has a construction which holds the compression ring member 13 and the oil ring member 14 in axially spaced relation and also exerts an outward pressure on the two members. The spacer-expander also tends to urge the compression ring member 13 into sealing engagement with the upper side of the groove and with the ledge 24 and to urge the inner peripheral portion of the oil ring member into sealing engagement with the lower side of the groove.

I claim:
1. The combination of a piston having an annular groove with an annular inwardly extending channel at its upper side providing an upwardly facing ledge, and a piston ring mounted in said groove and comprising a compression ring member at the upper side of the groove and extending into said channel, an oil ring member at the lower side of the groove, and a spacer-expander bearing outwardly and axially against both of said members for urging the members against the respective sides of the groove and for urging them outwardly.

2. The combination of claim 1, in which said oil ring member comprises a rail, and said spacer-expander has abutment means engaging the inner periphery of said rail.

3. The combination of claim 2, in which said abutment means slants inwardly and downwardly to exert a component of force tending to urge the rail at its inner periphery into sealing engagement with the lower side of the groove.

4. The combination of claim 1, in which said compression ring member is shaped so that it has a tendency to twist upwardly at its outer periphery, and said spacer-expander tends to increase said tendency to twist.

5. The combination of claim 4, in which said compression ring member and said spacer-expander have interengaging means at the lower side of the compression ring member adjacent the outer periphery thereof whereby the force exerted by said spacer-expander tends to increase the tendency of the compression ring member to twist.

6. The combination of claim 5, wherein said interengaging means is spaced outwardly from said ledge.

7. The combination of claim 5, in which said interengaging means comprises means extending downwardly from said compression ring member and axially extending means on said spacer-expander bearing outwardly on said downwardly extending means, said downwardly extending means and said axially extending means having interengaging surfaces slanting downwardly and outwardly.

8. The combination of claim 5, in which said interengaging means comprises a downwardly extending rib on said compression ring member and axially extending ears on said spacer-expander, said rib and said ears having interengaging surfaces slanting downwardly and outwardly.

9. The combination of claim 4, in which said compression ring member is beveled at the upper side of its inner periphery to provide said tendency to twist.

10. The combination of claim 1, in which said spacer-expander also tends to twist said compression ring member into sealing relation with the upper side of said groove and with said ledge, and to twist said oil ring member into sealing relation with the lower side of the groove.

11. The combination of claim 1, in which said spacer-expander comprises a sheet-metal circumferentially expansible member.

12. The combination of claim 1, in which said spacer-expander comprises a pair of independently functioning spring structures engaging the respective members, and a plurality of struts connecting said spring structures.

13. The combination of claim 1, in which said compression ring member is held axially spaced from said oil ring member by a component of the force exerted by said spacer-expander for urging said members outwardly.

14. The combination of a piston having an annular groove and an annular rib projecting outwardly from the bottom of the groove and axially spaced from the respective sides of the groove, said rib providing an upwardly facing ledge, and a piston ring mounted in said groove and comprising a compression ring member at the upper side of the groove and extending into the space between said ledge and the upper side of the groove, an oil ring member at the lower side of the groove and extending into the space between said rib and the lower side of the groove, and a spacer-expander engaging said compression ring member outwardly from said rib and extending into the space between said rib and the lower side of the groove and engaging said oil ring member therein.

15. The combination of claim 14, in which said spacer-expander comprises a pair of independently functioning spring structures, and a plurality of struts connecting said spring structures, one of said spring structures including means engaging said compression ring member for forcing it outwardly, said one spring structure extending downwardly and inwardly into the space between said rib and the lower side of the groove, the other spring structure being located at the lower side of the groove and engaging said oil ring member for forcing it outwardly.

16. The combination of claim 15, in which said rib is beveled at its lower outer corner to provide clearance for said one spring structure.

17. The combination of claim 14, in which said spacer-expander comprises a plurality of axially extending struts located adjacent the outer part of the groove, and a pair of independently functioning spring structures, one spring structure being connected to the upper ends of said struts and extending inwardly and downwardly therefrom and having means engaging said compression ring member for forcing it outwardly, the other spring structure being connected to the lower ends of said struts and extending inwardly therefrom and engaging said oil ring member for forcing it outwardly.

18. A combined compression and oil ring adapted to be mounted in a single groove in a piston, comprising a compression ring member, an oil ring member, and a spacer-expander for holding said members axially spaced and engaging said compression ring member intermediate its inner and outer peripheries for forcing them outwardly and axially against the sides of the groove.

19. A combined compression and oil ring according to claim 18, in which said compression ring member and said spacer-expander have interengaging means shaped so that the force exerted by said spacer-expander tends to force the compression ring member outwardly and to twist the compression ring member upwardly at its outer periphery.

20. A combined compression and oil ring according to claim 19, in which said compression ring member is shaped so that it has a tendency to twist upwardly at its outer periphery, and said spacer-expander tends to increase said tendency to twist.

21. A combined compression and oil ring according to claim 20, in which said compression ring member is beveled at the upper side of its inner periphery to give said compression ring member its tendency to twist.

22. A combined compression and oil ring according to claim 18, in which said compression ring member has an annular rib on its lower side adjacent its outer periphery and said spacer-expander has a plurality of ears engaging outwardly against said rib.

23. A combined compression and oil ring according to claim 22, in which said rib and said ears having interengaging surfaces slanting downwardly and outwardly whereby said spacer-expander tends to twist said compression ring member upwardly at its outer periphery.

24. A combined compression and oil ring according to claim 18, in which said spacer-expander comprises a pair of independently functioning spring structures, one for forcing said compression ring member outwardly and the other for forcing said oil ring member outwardly, and a plurality of axially extending struts connecting said spring structures.

25. A combined compression and oil ring according to claim 24, in which said one spring structure extends inwardly and downwardly from the upper ends of said struts and said other spring structure extends inwardly from the lower ends of said struts.

26. A combined compression and oil ring according to claim 24, in which said compression ring member has a downwardly extending annular rib, and said one spring structure includes a plurality of upstanding ears engaging said rib.

27. A combined compression and oil ring according to claim 24, in which each of said spring structures comprises a plurality of connecting elements connected to said struts, and a plurality of U-shaped spring elements connected to said connecting elements.

28. A combined compression and oil ring according to claim 27, in which the connecting elements of said one spring structure are formed to provide ears engaging said compression ring member.

29. A combined compression and oil ring according to claim 27, in which the connecting elements of said other spring structure are provided with shoulders engaging the inner periphery of said oil ring member.

30. A combined compression and oil ring according to claim 18, in which said spacer-expander tends to force said oil ring member downwardly at its inner periphery.

31. A spacer-expander for a combined compression and oil ring having a compression ring member and an oil ring member, said spacer-expander comprising a pair of independently functioning spring structures, and a plurality of axially extending struts connecting said spring structures, one of said spring structures having a plurality of upstanding ears adapted to engage the compression ring member.

32. A spacer-expander according to claim 31, in which each of said spring structures comprises a plurality of connecting elements connected to said struts, and a plurality of U-shaped spring elements connected to said connecting elements, the connecting elements of one of said spring structures being shaped to provide said ears.

33. A spacer-expander according to claim 32, in which the connecting elements of the other of said spring structures extend inwardly between their associated spring elements and are bent to provide a shoulder for engaging the oil ring member.

34. A spacer-expander for a combined compression and oil ring having a compression ring member and an oil ring member, said spacer-expander comprising a pair of independently functioning spring structures, and a plurality of axially extending struts connecting said spring structures, one of said spring structures extending downwardly and inwardly from the upper ends of said struts.

References Cited in the file of this patent
UNITED STATES PATENTS

| 2,283,056 | Guardiola | May 12, 1942 |
| 2,424,881 | Fall | July 29, 1947 |
| 2,768,039 | Cable | Oct. 23, 1956 |
| 2,777,740 | Hsia-Si-Pien | Jan. 15, 1957 |
| 2,886,384 | Hamm | May 12, 1959 |